| United States Patent [19] | [11] Patent Number: 5,028,264 |
| Miner | [45] Date of Patent: Jul. 2, 1991 |

[54] METHOD FOR PRODUCING SOLUBLE POLYMERIZED OILS

[76] Inventor: Philip S. Miner, 4634 Holly Lane, Holladay, Utah 84117

[21] Appl. No.: 342,891

[22] Filed: Apr. 24, 1989

[51] Int. Cl.$^5$ .............................................. C08L 91/00
[52] U.S. Cl. .................................... 106/244; 106/248; 106/252; 106/253; 106/266
[58] Field of Search ............... 106/244, 248, 252, 253, 106/266

[56] References Cited

U.S. PATENT DOCUMENTS

| 1,725,561 | 8/1929 | Booge et al. | 106/250 |
| 1,902,684 | 3/1933 | Asser | 106/250 |
| 1,915,555 | 6/1933 | Sommer et al. | 106/250 |
| 2,298,915 | 10/1942 | Auer | 106/244 |
| 2,298,917 | 10/1942 | Auer | 106/244 |
| 2,736,666 | 2/1956 | Beacham | 106/252 |
| 3,183,109 | 5/1965 | Neumann et al. | 106/244 |

*Primary Examiner*—William R. Dixon, Jr.
*Assistant Examiner*—Anthony J. Green

[57] ABSTRACT

This invention is related to making oil paint mediums or varnishes by heating purified linseed or similar oils sufficiently to cause gelling, either with or without catalysts or additives. After sufficient heating, the oil remains a heated liquid, but with the capabilities of becoming a gel at reduced temperatures. Solvent is added and is mixed into the liquid, potential gel, until it becomes a solution. This cooled solution maintains the capabilities to gel, but gelling is then delayed until the solvent evaporates during use.

9 Claims, No Drawings

METHOD FOR PRODUCING SOLUBLE POLYMERIZED OILS

BACKGROUND OF THE INVENTION

The paintings of Rubens were the original inspiration for this invention. Since 1640, his paints have remained flexible and uncracked. An analysis of modern paintings, with their tendencies to degrade and crack after as little as five years, demonstrates a disgraceful contrast between modern paints and much medieval painting. The potential for degradation of all modern oil paintings, toward early oblivion, should have long since spurred changes in paint formulation. Experimental exposures, used with all commercial paints, clearly establishes this confusion. Unbelievable contrasts in resistance to change, have been completely ignored by modern paint technicians, who believe they specialize in art materials, but ignore technology and reality.

After years of painting and research, it became apparent that the most-durable and usable oil paints could be made from most-highly-polymerized oil. Oil mediums and permanent varnishes should also contain sufficient lead soaps to maintain flexibilities, but not enough to cause oversoftening.

Normally-sized, reactive-pigments are not necessary if sufficient reactivities can be attained without pigment grains. Because of effective quantities of reactive-soaps in all mediums, areas on paintings which contain no reactive-pigments, would have sufficient and possibly ideal reactivities. Because of this, there would be no weakened and unreactive areas of paint which would be conducive to cracking.

From all the research that was available, oil gels were so highly polymerized that it was impossible to use them. Gels were resistant to solvents at normal temperatures; would they be resistant to heated solvents? Would a hot and liquid gel be resistant to strong solvents? It was finally determined that gels were hot liquids before they cooled and thickened, to become gels; they could then be made into solutions if they were mixed with strong solvents while they were still liquid, before they gelled. After the solvent eventually evaporated, the gel would assume its highly resistant qualities of being resistant to solvents, acids and alkalis.

The paints and mediums of this invention are based upon making oil gels and then making them go into solution before they would cool enough to become resistant to solvents.

After many attempts, ways to use gels in paints and mediums were finally established. Many types of highly-polymerized paints and oil gels were made and their resistance to changes were tested by exterior exposures. Oil gels were determined to be the most-resistant of all oil paints.

These paints are unaffected by solvents, strong acids and strong alkalis. When durability is important, gel-based varnish should supplant all permanent natural varnishes, used in art and for many used commercially. Many commercial varnishes are far less resistant than gel-oil varnishes with effective additives. A gel-oil varnish with sufficient lead soaps for the maintenance of flexibility, is sufficiently hard to resist the environments of paintings, without hardening oxidative driers. For many commercial applications, many combinations of driers could be used.

The resistant gel paint would not only resist oxidation, but with a sufficient volume of lead soaps, would repel oxidation if it should occur in the future. Much research shows that lead soaps have these regenerative qualities. Lead soaps do not oxidize, so they maintain their reactive qualities indefinitely. Not only would paints similar to those of Rubens be possible, but the benefits of very resistant commercial paints would be of high value. Hardness or softness of gels can be controlled with conventional additives, baking or processing.

Gelled oil molecules were made to be so large and impenetrable, that they would prove to be most-resistant to change. They would resist oxidation, rather than require oxygen for solidification. The most-unalterable oil molecules would be the basis for these paints, which, along with sufficient lead soaps, would be resistant to water, as a cause for embrittlement.

Because a gel becomes a solid, painting with a gel in solution becomes much like painting with varnish as a medium. When the solvents evaporate, the pigment and gel combination could be made to solidify rapidly, so that almost-immediate and thin overpainting could be used. Varying the rates of evaporation, could speed or slow the solidification of paint layers. Paintings which might require months to paint with oxidizing oil could be painted with dispatch, within a few days. The drying of commercial paints can be altered by the addition of differing volatiles.

SUMMARY OF THE INVENTION

This invention is a process, for changing purified vegetable oils, such as linseed or polymerized vegetable oils to gels; then forcing them to become liquid. The gels of these oils, when they are finally allowed to form, then become impervious to solvents and resistant to chemicals and oxidation. As a contrast, in most oil paints, oxidation, necessary for drying, becomes a catalyst which causes more oxidation. Eventual embrittlement results. Small amounts of lead soaps, formed during gel formation during heating, are extraordinarily effective; they resist and even decrease oxidation, when it eventually occurs in aged paint films.

During the early inventive process, fully-gelled, hot-liquid oils were made, and successfully mixed with highly-polymerized oils, plus small amounts of solvent. Paint mediums and paints were made which contained largely-gelled oils and smaller amounts of highly-polymerized oils. Less-polymerized oils can be used, along with the gelled oils. The most-effective adding of highly polymerized oils to gelled oils was made while the gel was still hot and liquid; only a small sample was allowed to actually become a gel. The plymerized oil and the potentially-gelled oil were then well-mixed, with a solvent and all gel agglomerates dispersed into generally smaller amounts of less-polymerized oil. They could then be thinned with most conventional thinners, for excellent brushing qualities.

These paints were very durable because their average of polymerization remains very high, yet they can be made to be variably solvable, using solvents of differing strengths. This paint-type is a part of this invention; some of its advantages are that it can be made to be sufficiently solvable in cold solvents, for many uses. Its average molecular size is very large, with some oil molecules which are initially, solvent-sensitive. Its films can be baked, to make them tougher and more resistant. Conventional combinations of driers can be used for various commercial purposes.

Ways were finally discovered which would enable the fixed vehicle of excellent paints and varnishes to be made solely from gelled oils. Because of very high polymerization of these paints, they have excellent resistance to solvents, acids and alkalis. They are resistant to light and when they are suitably mixed with small amounts of completely-dispersed lead soaps, they can remain resistant to oxidation and embrittlement, for centuries.

Commercial methods of thickening purified oils in gels can normally be used for these processes. The heated polymerization processes are continued until the heated and liquid oil becomes sufficiently polymerized to form gels; if allowed to cool. A cooled gel is completely resistant to solvents such as toluene. A basic difference with this process is that potential-gelling is reached, but is not allowed to actually form in the main body of heated and liquid oil; samples can be cooled to sufficient gels instead. Samples can verify that the hot liquid gel will cool to a gel.

Before gelling actually occurs, the liquid potential-gel is thinned with a suitable solvent, such as toluene. The solvent gases generated when the extremely hot, potential-gel is mixed with the solvent liquid, helps to open the gel molecules and to make them solvable with the liquid solvent. Solvent liquid can then be well-mixed into the gel, until its temperatures fall to below the temperatures necessary for gas and solution formation. When the gel temperatures become too low, only mixtures of the gel and the volatile can be made. Mixtures can be useful, if they are without many solvent-resistant grains which would then require settlement for clear gloss.

Lead can be added to the oil prior to heating; it is then reduced to lead soaps during the heating process; only small quantities are necessary to prolong, long-term flexibilities. Other additives such as zinc and other driers can be added for their varied and valued reactivities, for many other uses.

The formation of heated gels must of course be accomplished in air-tight heating containers which have excluded oxygen. Ideally, no oxygen is allowed to contact any heated oil. The fatty acids which have been separated from the oil by heating are expelled. The heated container should be checked to make certain that there are no areas of scorching of the gel, so that a clear color can be maintained.

The gelled oil might have to be removed from its heating container, so that there is sufficient space for the addition of solvent, without blackened residue.

The solvent is added and mixed into the heated and liquid gel as soon as very small amounts of solvent can be mixed into it. At first, it is the gas from the solvent which is to be dispersed into the liquid gel, then the liquid solvent itself. With intensive mixing, much of the solvent continues to form into gas, throughout the liquid gel. The formation of solvent gas is important in making the gel become a solution.

This is a critical time, because it is the only time during the process, that strongly-formed gels can be wholly made into solutions; agglomerates are least-likely to survive this mixing. After this mixing process, there can be some dispersal of partially-mixed gel, but for the most part, small gel agglomerates cannot be dispersed into solvents such as toluene. Very fine grains of gel which appear to cloud solutions, remain impervious to solvent, but they can be settled-out of thinned solutions.

The gas from heated solvent should permeate the hot gel; this is enabled by intensive mixing at necessary temperatures, with sufficient solvent becoming solvent gas.

Once a solution has been formed, the cooled gel solution can then be mixed with pigments and other volatiles, to viscosities which are most-usable for painting of all kinds. The key to mixing other volatiles into gel solutions is attaining a verified solution when the initial heated solution is made.

It is important to keep the person who makes the gelled oil and then thins it, separated from the fumes which are caused by making gels and solutions. The fatty acids which are fumes from oil polymerization must generally be transported through a hose, away from where they can be breathed. The solvent gases are very strong and should not be breathed. If the heated gel must be poured from one container to another, in the air, a smoky material passes into the air which is noxious and very strong. In systems which are not enclosed, it is very important to wear a mask suitable for filtering gases and mists. A mask should be worn during the pouring of hot oil and during mixing of solvent with heated oils.

In commercial systems, all of the heating, cooling and mixing processes can be completed in enclosed systems. Noxious gases such as the fatty acids, solvent gas and oily smoke, need not occur in open air, but in pipe systems which harmlessly dispose of them, if they occur.

An experimental setup was used to make many small batches of gelled medium, so that the problems with paint making, vehicle making and thinning could be solved. Many differing setups were tried, from laboratory glassware, stainless steel pots, etc.

The simplest and most effective heating container is a typical coffee carafe with an opening of about 2½ inches on top. This was plugged with a laboratory-grade rubber stopper. Transparency, the convenient handle and strong round shape make carafes useful.

Holes for a thermometer, and tubes for sampling and carrying the fatty acids to the water trap, can be drilled into the stopper. One short hose connects the carafe to the water trap and another transports the fatty acids from the water trap to where they cannot be smelled.

An 800 to 1000 watt electric heating plate with a thermostat can be used to slowly heat the oil, as from one to five percent basic lead carbonate or equivalent, can be mixed into the oil with a stainless steel wire brush.

Prior to much heating, the top of the carafe can be filled with a rapidly-evaporating volatile and the temperature is kept just high enough, so that it soon evaporates; thus creating a vacuum which is helpful in causing the fatty acids to leave the oil with further heating.

During heating, samples of highly-polymerized oils can be pulled apart; after early polymerization, threads stretch out between samples. When gels have formed, after sufficient heating, these threads will no longer form; fresh, cooled gels repel change and are slippery, rather than forming threads.

The sufficiently-gelled and heated oil is poured from the carafe into the mixing pan, and then mixed with solvent. These important functions must take place outside, and the operator must wear a mask which filters dusts and mists.

A strong solvent such as toluene can be used as the volatile for thinning the hot and liquid, potential-gel. A high-speed drill with an extension rod can be used with a stainless-steel wire brush of about 2½ or 3 inches in diameter, to effectively mix the solvent into the potential-gel.

It is best to know the proportion of gel to solvent, after all evaporation has occurred, so that any solution could be repeated, and if paints were to be made, the volume of the wetted pigment to fixed medium could be determined.

From one, up to about three parts solvent, by volume, can generally be mixed with one part gel. Sufficient temperatures can be maintained so that the solvent actually goes into solution with the gel and samples show that there are few agglomerates of gel remaining in the solution. The temperatures of the gel and the solvent should be maintained as high as possible during this intensive mixing, so that the gel will go into solution.

Paints can be made with any good equipment which will mix the gel medium and pigments sufficiently to break up the pigment agglomerates. I have used a wire brush, with its bristles pointed down at about 45°, to mix the necessarily-numerous small batches of paint which I have made. Gel agglomerates are more difficult to disperse than pigment agglomerates.

A glass bottle, slightly larger in diameter than the wire brush, can be used to mix small amounts of paints and the brush can be forced against the bottom to gain the effects of a roller mill, and not wear holes in the bottom with the brush pressures. Most-resistant volumes of pigment to fixed binder can be easily determined by measuring the volume of any added materials in a bottle. One inch of gel and one half inch of wetted pigment plus any volatiles, will make very good paints if sufficiently dispersed.

Both pigments and weak thinners can be mixed into the gel solution. With sufficient mixing, which generates heat, the gel and pigment combination can be forced to form into a thixotropic paint which will hold both pigments and thinners in a very light gel which is ideal for painting and maintaining paint consistencies during long-term storage.

For hundreds of years, artists and their manufacturers have been making paints which are dependent upon the viscosities of differing pigments and thin raw oil. Because the pigment to vehicle ratios have been so generally oil-poor and malformed by these traditions, artists have been painting with weakened paints, generally with insufficient volumes of oxidizing oil, for centuries.

Thin oil, which requires oxidation for drying, becomes a catalyst for further oxidation; without the reactivities of lead, embrittlement is certain. By using large percentages of zinc, as do many manufacturers, embrittling tendencies are enhanced.

Relatively small percentages of well-dispersed lead soaps are required for resistance to oxidation, crosslinking and embrittlement. The extremely-large molecular structures of gels leave few reactive points on gel molecules where they can react with alkalis, acids, solvents or oxidation. The actions of water are repelled by lead soaps. It has been proved that lead soaps have the capabilities to reverse oxidation if it does occur in aging paint films.

Gel-based paints are inherently soft and flexible, but they can be hardened by many additives, to where they would be more resistant to abrasion, with many of the qualities which are necessary for the finest and most-resistant commercial paints.

All of the qualities which make excellent artists' paints, can be used to make excellent commercial paints.

Lead soaps are necessary for really long-term resistance to change, but even without lead, the resistant molecular formations of lead-free paints make them exceptionally resistant to change. Many additives, such as cerium, zirconium, zinc, cobalt, manganese, calcium and iron can be added to commercial paints, for various applications. Gel-based paints are resistant to so many effects which normally destroy paints, that they could be used wherever high resistance is necessary.

DETAILED DESCRIPTION

This invention is a process for gelling purified raw or polymerized vegetable oils, then thinning them. They can then be used for paints, mediums, varnishes, or other uses.

Conventional methods and equipment, used for polymerizing oils, can generally be used for this process. The main differences are, that higher levels of polymerization are reached and maintained for the hot, liquid potential-gel.

Actual gelling is not allowed to occur in the main body of the hot, liquid, potential-gel. Instead, it is thinned and intensively-mixed with a suitable solvent and its gases, so that when it is cooled, it will remain liquid. The forming of actual gels is delayed until after application, and any added volatiles have evaporated.

The cooled gel is resistant to solvents such as toluene, so that most-effective methods of making paint vehicles should be attempted only before gelling occurs. When the gel has formed, its solidified paints or varnishes are resistant to solvents, acids and alkalis.

It would seem to be impossible to mix a solvent such as toluene into a hot and liquid potential-gel. The temperatures of the heated oil seem to be far too high. Very little of the solvent is actually mixed into the heated oil while its temperatures are at their highest. The gases caused by contact with the heated oil can be mixed in, as the solvent is heated to a gaseous state, generally by contact with the liquid gel. The combination of solvent gases and solvent can be mixed into the liquid gel, as it becomes reduced in temperatures.

As the liquid gel is allowed to cool, more of the solvent liquid can be mixed into the gel; at first it immediately becomes solvent gas, which is then dispersed as much as possible into the liquid gel. This gas is an important vehicle, which does much to enable hot, liquid volatiles to be made into solutions with the hot, potential gel. It is most-important to disperse all agglomerates into the solution during this mixing process, because when temperatures of the gel become lowered, solvent gas is no longer formed and solutions of the gel and solvent are often not completely formed. The gel might become partially a solution, with some of it becoming extremely-small, haze-like specks of solvent-resistant gel, which can generally be settled-out of thinner solutions, along with larger agglomerates. Once a partial solution has formed and cooled, it is very difficult to make the gel agglomerates go into solution, especially those that are very small.

During strong mixing, the gel cools somewhat, but continues to evaporate the liquid solvent, within the gel body; this forms gas within the gel body, along with the liquid solvent, which should be effectively-dispersed throughout the liquid gel. Ideal temperatures for making the gel into a solution appear to be, approximately when most of the solvent can be mixed into the gel, but then evaporates and is mixed into the potential gel, along with any solvent which does not become a gas.

The solvent gas is an activator which helps to cause the gel to go into solution, along with the high temperatures.

Eventually, the liquid gel, which has been made into a solution, becomes sufficiently cooled, so that solvent gas will no longer form. At about this temperature, much of any additional volatile does not become a solution, but forms a mixture with the solution. If agglomerates of gel remain, they could become very difficult to dissolve. They might have to be settled-out, or they could be filtered, after cooling.

Mixtures of solutions and volatiles are useful for some purposes, but the volatiles not in solution will eventually separate, and have to restirred into the paint or medium.

There are other ways of making gels go into solutions with other volatiles and oils. A liquid and hot potential gel can be made to go into solution with other oils and volatiles by intensively mixing the non-gelled oil and a suitable solvent into the hot and liquid, potential gel. The degree of polymerization of the polymerized oil and its quantity will determine the solvent which is necessary to hold combinations in solution.

A less-polymerized oil may be added to the potential gel, i.e. an oil which is polymerized but not sufficiently polymerized. that it forms polymerized potential gel when cooled. This increases the solubility of the polymerized oil mixture in solvents, and allows the use of weaker solvents for making a paint medium.

The natures of gels change as they age. At first, when they are cooled, they are weak, as are other newly-formed gels. As they age, they become tougher and more-resistant to all effects; they eventually become tough and leathery but they maintain rubbery qualities. Soaking well-formed gels, gel agglomerates and gel-based paints in cold solvents such as toluene, makes them tougher and more-resistant to abrasion, volatiles and change. Heating and baking gel films makes them become more leathery and tough.

Cooled and evaporated samples, examined through a ten power glass, can be used to determine the extent of agglomerates which remain in solutions. A clear solution is the ideal, when the bottled medium is held up to the light. The clearest solutions can generally be attained by intensive mixing at sufficient heat, and then allowing the mediums to settle sufficiently so that they become completely clear.

In order to make the most permanently-flexible paints, lead must be used effectively. Lead pigment grains are not effective in paint mediums; it is lead soaps which are often formed from lead pigments, which cause reactive effects. When basic lead carbonate is reduced to clear lead soaps, and the soaps are combined with the oil polymers during their forming, only small volumes of lead soaps are required for unique reactive qualities, somewhat typical of leaded paints. When all of the mediums used on paintings contain effective quantities of lead soaps, all of the paints, no matter if their pigments are completely unreactive, or if there are no pigments; they will be protected from embrittlement by lead soaps in all mediums.

Without lead pigment grains to generate excessive reactivities and perhaps oversoftening, lead-soap-containing paint films should remain flexible to an ideal degree, established by levels of reactions based upon testing of similar samples.

Lead soaps do not oxidize, so they remain in paint films, poised to react when the chemistry of the paint film changes sufficiently for reactions against acid formation, oxidation, crosslinking and embrittlement.

When gels are made to be solutions with solvent, a solution of one part gel to one part solvent can easily be made; two solvent and one part gel is possibly the most usable, both for paint and medium making. Three parts solvent, by volume and one part gel might cool the gel too much to make the solution so that it would be without agglomerates. Added heating of the mixing container might be required to make larger additions of solvent, possible.

After a solution has been made from the gel, a thinner solution can be made by heating and strongly mixing the gel and a solvent such as toluene together; many agglomerates are often reduced. The solution then is expanded to include the added and well-mixed in solvent, by the heated mixing. Any remaining agglomerates will not generally become parts of the solution, but they can be settled out of the thinned solution, generally within a few days.

If the medium has cooled, and it contains one part gel and two parts toluene, paints can be most-effectively made from it. The most durable volume of wetted pigments is about 33% pigment and 67% actual oil gel. If two parts of a medium is solvent, and one part gel, it would require ½ part pigment, determined by its wetted volume, to be well-mixed into the solution. Its volume could then be determined, without generating heat so that the volatile would partially evaporate. Only light mixing is necessary, to determine pigment volumes.

When the pigment volume is determined, strong mixing pressures can begin, which will eventually disperse pigment agglomerates. Strong mixing pressures cause heat and heat evaporates the solvent from the paint and increases viscosities. The higher the viscosity, the more effective is the mixing pressures applied to pigment agglomerates.

When tests determine that pigment agglomerates have been dispersed, the viscosity of the paint can be decreased by adding volatiles, with evaporation-rates which are most-compatible with differing painting techniques. Mineral spirits makes a good thinner because its evaporation-rate is often satisfactory, but either faster or slower rates of evaporation can be attained with other volatiles. Intensive mixing of the gel with any volatile will produce paints with excellent thixotropic qualities, both in the permanent container and on the painted object.

Generally, the preservation of elasticity and the prevention of embrittlement would be most-important qualities for artists' paints. For some uses the qualities of zinc oxide might be used or the qualities of combinations of zinc oxide and lead could be used. Zinc oxide can be used in the same manner as basic lead carbonate is used, to promote polymerization, and for its individual reactive effects. Many paints have proved to be more durable with combinations of zinc oxide and basic lead carbonate soaps. Zinc oxide soaps become transparent in the same ways as lead soaps. For specific, generally commercial purposes, all of the combinations of driers can be used to change the drying qualities of gel-based paints.

For commercial purposes, solvent gas alone, in conjunction with thinners, might be used to make gels liquid which would remain liquid after cooling.

Ultra-violet light absorbers can be easily mixed into gel-solutions.

Gel-based vehicles and gel-oil vehicles can be baked for increased-resistance qualities, such as toughness and tension.

I claim:

1. A process for modifying vegetable oils which comprises;
   (a) heating a vegetable oil under oxygen-free conditions to a temperature sufficiently high to form a polymerized potential gel and to prevent the polymerized potential gel from forming an insoluble gel,
   (b) dispersing vapors of a solvent in the heated vegetable oil sufficient to form a modified polymerized potential gel that is soluble in the solvent when the solvent is in liquid form, and
   (c) adding the solvent as a liquid to the vegetable oil to form a solution of the modified polymerized potential gel and the solvent.

2. The process of claim 1 wherein the solvent is toluene.

3. The process of claim 1 wherein the solution from step (c) contains small agglomerates of polymerized oil which are insoluble in the solvent, and the process additionally comprises a step (d) removing the insoluble agglomerates from the solution.

4. The process of claim 1 additionally comprising a step of adding a pigment to the solution from step (c).

5. The process of claim 1 additionally comprising a step of adding a thinner to the solution from step (c).

6. The process of claim 1 additionally comprising a step of adding a reactive material chosen from the group consisting of lead, zinc, manganese, calcium, iron, cerium, and zirconium.

7. The process of claim 1 wherein the lead is basic lead carbonate, and the zinc is zinc oxide.

8. The process of claim 1 additionally comprising the step of adding a polymerized oil to the polymerized potential gel, which polymerized oil is not sufficiently polymerized to form a polymerized potential gel.

9. A process for modifying vegetable oils which comprises;
   (a) heating a vegetable oil under oxygen-free conditions to a temperature sufficiently high to polymerize the vegetable oil and form insoluble gels if the oil were allowed to cool, but wherein the oil is maintained at a sufficiently high temperature to prevent formation of the gels,
   (b) dispersing a liquid solvent into the heated vegetable oil such that when the liquid solvent contacts the heated vegetable oil, a portion of the solvent boils into a vapor and the vapor disperses through the heated vegetable oil, and
   (c) maintaining dispersion of the liquid solvent as the vegetable oil cools to a point that the solvent does not form substantial vapor and is dispersed into the vegetable oil as a liquid to form a solution of the polymerized vegetable oil and the solvent.

* * * * *